US006862324B1

United States Patent
Lui et al.

(10) Patent No.: US 6,862,324 B1
(45) Date of Patent: Mar. 1, 2005

(54) DATA AIDED SYMBOL TIMING SYSTEM FOR PRECODED CONTINUOUS PHASE MODULATED SIGNALS

(75) Inventors: Gee L. Lui, Westminster, CA (US); Kuang Tsai, Santa Ana, CA (US)

(73) Assignee: The Aerospace Corporation, El Segundo, CA (US)

(*) Notice: Subject to any disclaimer, the term of this patent is extended or adjusted under 35 U.S.C. 154(b) by 799 days.

(21) Appl. No.: 09/696,525

(22) Filed: Oct. 23, 2000

(51) Int. Cl.[7] .......................... H04L 27/14; H04L 27/22
(52) U.S. Cl. .................................................. 375/326
(58) Field of Search ................................ 375/316, 362, 375/326, 329, 334, 261, 336, 330, 331, 335; 329/308

(56) References Cited

U.S. PATENT DOCUMENTS

| | | | | |
|---|---|---|---|---|
| 4,355,214 A | * | 10/1982 | Levy et al. ................. | 370/291 |
| 5,089,822 A | * | 2/1992 | Abaunza et al. ............. | 342/30 |
| 5,623,485 A | * | 4/1997 | Bi ............................... | 370/209 |
| 5,963,586 A | * | 10/1999 | Durrant et al. ............. | 375/208 |
| 6,009,317 A | * | 12/1999 | Wynn ......................... | 455/296 |
| 6,127,884 A | * | 10/2000 | Rishi .......................... | 329/304 |
| 6,151,367 A | * | 11/2000 | Lim ............................ | 375/326 |
| 6,208,201 B1 | * | 3/2001 | Markarian .................. | 329/308 |
| 6,219,534 B1 | * | 4/2001 | Torii ........................... | 455/303 |
| 6,389,082 B1 | * | 5/2002 | Takigawa et al. ........... | 375/316 |
| 6,546,055 B1 | * | 4/2003 | Schmidl et al. ............. | 375/244 |
| 6,665,356 B1 | * | 12/2003 | Goeddel et al. ............ | 375/329 |
| 6,693,970 B2 | * | 2/2004 | Vankka ........................ | 375/261 |

OTHER PUBLICATIONS

Huber, Johannes, "Data-aided Synchronization of Coherent CPM-Receivers," IEEE Transactions on Communications, p. 178-198.
D'Andrea, A. N., Mengali, U., Morelli, M., "Symbol Timing Estimation with CPM Modulation," IEEE Transactions on Communications, vol. 44 (No. 10), p. 1362-1372, (Oct. 10, 1996).

* cited by examiner

Primary Examiner—Mohammed Ghayour
Assistant Examiner—Dung X. Nguyen
(74) Attorney, Agent, or Firm—Derrick Michael Reid

(57) ABSTRACT

Data aided carrier phase and symbol timing synchronizers are implemented at baseband as digital modulators isolating input signal inphase and quadrature component signals fed into inphase and quadrature Laurent transforms that function as data detector to provide odd and even data bit multiplexed output data signal while cross coupling the inphase and quadrature transformed outputs for removing data modulation in error signals to correct phase errors and timing errors in the received signal so as to provide reliable data demodulation of noisy received signals having dynamic carrier phase and symbol timing errors as found in continuous phase modulation communications systems such as Gaussian minimum shift keying communications systems.

19 Claims, 6 Drawing Sheets

SYMBOL TIME SYNCHRONIZER

SYMBOL TIME SYNCHRONIZED DATA DEMODULATOR

SYMBOL TIME SYNCHRONIZER

CARRIER PHASE SYNCHRONIZED DATA DEMODULATOR

CARRIER PHASE SYNCHRONIZER

LAURENT PULSE FUNCTIONS

EARLY-LATE GATE FUNCTION

SYMBOL TIMING ERROR DISCRIMINATOR CURVE

CARRIER PHASE ERROR DISCRIMINATOR CURVE

DATA AIDED SYMBOL TIMING SYSTEM FOR PRECODED CONTINUOUS PHASE MODULATED SIGNALS

REFERENCE TO RELATED APPLICATION

The present application is related to applicant's copending application entitled Data Aided Carrier Phase Timing Tracking System for Precoded Continuous Phase Modulated Signals, Ser. No. 09/694,650, filed Oct. 24, 2000, by the same inventors.

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of continuous phase modulation communications systems. More particularly, the present invention relates to symbol time tracking for continues phase modulations communications systems, such as Gaussian minimum shift keying communications systems having small bandwidth time products.

BACKGROUND OF THE INVENTION

In synchronous digital data communication systems, the carrier phase and symbol timing of the received signal must be acquired and tracked by the receiver in order to respectively demodulate the received signal and to recover the transmitted data from the received signal. Typically, receivers require carrier phase tracking for signal demodulation and symbol time tracking for data detection for generating received data streams.

Continuous phase modulation (CPM) provides a class of digital phase modulation signals that have a constant envelope. The spectral occupancy of a CPM signal can be controlled or tailored to the available bandwidth of a transmission channel. The constant envelope CPM signals allow saturated power amplifier operation for maximum power efficiency. The use of CPM signals in communications systems can potentially achieve significant improvement in both power and spectral efficiency over other conventional modulation techniques, at the cost of a moderate increase in receiver complexity. Bit error rate reduction has been achieved using trellis CPM demodulation with ideal synchronization. There is a continuing need to develop hardware implementation of the symbol time and carrier phase synchronizers that provides required tracking functions for the coherent CPM receiver. Often, symbol time tracking and carrier phase tracking limit the performance of CPM systems.

A particular type of CPM system is a Gaussian minimum shift keying (GMSK) system where a data sequence is precoded and the precoded data symbols are used for continuous phase modulation. The GMSK received signals are filtered using Laurent filters and samplers for providing data samples subject to trellis demodulation for generating an estimate of the data sequence. Carrier phase tracking loops are used for demodulating the received signal by tracking the carrier phase, and symbol time tracking loops are used for synchronized sampling of Laurent matched filter signals for generating the data samples that used to generate estimates of the transmitted bit stream using trellis demodulation. These carrier phase and symbol time tracking loops are often referred to as synchronizer. These synchronizers often lose track during noisy communications.

A binary continuous phase modulation signal can be described by complex envelop equations.

$$z(t) = Re(z_b(t)e^{j2\pi f_c t})$$

$$z_b(t) = \sqrt{2E_b/T}\, e^{j\phi(t,\alpha)}$$

$$\phi(t,\alpha) = \pi h \int_{-\infty}^{t} \sum_{n=0}^{N-1} \alpha_n f(t-nT)\, dt$$

$$= \pi h \sum_{n=0}^{N-1} \alpha_n g(t-nT)$$

The term $Z_b(t)$ is called the complex envelope of the CPM signal, $f_c$ is the carrier frequency, $E_b$ is the bit energy, T is the bit duration, and N is the transmitted data length in bits, $\alpha = (\alpha_0 \alpha_1 \ldots \alpha_{N-1}), \alpha_i \in \{\pm 1\}$, represents one of $2^N$ equally probable data sequences. The parameter h is the modulation index, f(t) is the pulse response of the smoothing filter in the CPM modulator, and g(t) is the CPM phase response defined in terms of the f(t) pulse response.

$$g(t) = \int_{-\infty}^{t} f(s)\, ds$$

The pulse response f(t) is limited to the time interval [0,LT] for some integer L and having the properties that f(t)=f(LT−t) and g(LT)=1. The pulse amplitude modulation (PAM) representation of signal CPM envelope is well known. Laurent has shown that the complex envelope $z_b(t)$ can be expressed as a double summation.

$$z_b(t) = \sqrt{2E_b/T} \sum_{k=0}^{2^{L-1}-1} \sum_{n=0}^{N-1} a_{k,n} h_k(t-kT)$$

In this PAM representation of the baseband CPM signal envelope, also referred to as the Laurent decomposition, the $a_{k,n}$ values are known as pseudo data symbols and are related to the modulated data symbols generally by a pseudo data symbol equation.

$$a_{k,n} = \exp\left(jh\pi\left[\sum_{m=0}^{n}\alpha_m - \sum_{i=0}^{L-1}\alpha_{n-i}\beta_{k,i}\right]\right)$$

In the pseudo data symbol equation, for all k, $0 \le k \le 2^{L-1}$, $\beta_{k,0}=0$ and $\beta_{k,i}$ is a 0 or 1 digit in the binary expansion of $$k = \sum_{i=1}^{L-1} 2^{i-1} 2^{i-1} \beta_{k,i}.$$

These pseudo data symbols take on values in the set $\{\pm 1, \pm j\}$ when the modulation index h equals ½. In general, the first two pseudo data symbols, $a_{0,n}$ and $a_{1,n}$ can be written in an expanded form.

$$a_{0,n} = \exp\left(j\pi h \sum_{m=0}^{n} \alpha_m\right) = a_{0,n-1} J^{\alpha_n},$$

$$a_{0,-1}=1,\ J=e^{j\pi h}\ a_{1,n}=a_{0,n-L} J^{\alpha^n} J^{\alpha^{n-2}} J^{\alpha^{n-3}} \ldots J^{\alpha^{n-L+1}}$$

The set of pulse functions $\{h_k(t)\}$, termed Laurent pulse functions, have a real value and are finite in duration, and are formed by an $h_k(t)$ equation.

$$h_k(t) = \sum_{i=0}^{L-1} c(t + iT + (\beta_{k,i} - 1)LT)$$

where $$c(t) = \begin{pmatrix} \sin(\pi h - \pi h g(|t|))/\sin(\pi h), & |t| \le LT \\ 0, & \text{elsewhere} \end{pmatrix}$$

Among these $h_k(t)$ pulses, most of the signal energy is carried by the principal Laurent pulse $h_0(t)$, which has a duration of L+1 bit times. Another property of the principal Laurent pulse $h_0(t)$ is that it is symmetrical about t=(L+1)T/2. The principal Laurent function $h_0(t)$ output provides a gross estimate of the transmitted symbol sequence. These properties of the principal Laurent pulse function $h_0(t)$ have not yet been exploited in developing the error signals for the symbol time and carrier phase tracking loops. These and other disadvantages are solved or reduced using the invention.

SUMMARY OF THE INVENTION

An object of the invention is to provide data aided symbol timing tracking in continuous phase modulation communication systems.

Another object of the invention is to provide data aided symbol timing tracking in a Gaussian minimum shift keying communications systems.

Yet another object of the invention is to provide data aided carrier phase tracking in continuous phase modulation communication systems.

Still another object of the invention is to provide data aided carrier phase tracking in a Gaussian minimum shift keying communications systems.

Still another object of the invention is to provide data aided carrier phase synchronizers and symbol time synchronizers in Gaussian minimum shift keying communications systems using principal Laurent responses for generating carrier phase and symbol time errors.

The present invention is directed to data aided synchronization in digital carrier phase and symbol timing synchronizers applicable to precoded continuous phase modulation (CPM) signal formats, such as in Gaussian minimum shift keying (GMSK) communications systems having, for example, a modulation index of ½ with a bandwidth time product (BT) of ⅕. The imbedded synchronizers enable simple implementations for data demodulation for CPM signals, such as GMSK signals with small BT values. Data aided tracking is applied in one form to symbol time tracking, and in another form, to carrier phase tracking. An advantage of the proposed data aided symbol timing synchronizer is the combination of both symbol timing tracking and data demodulation functions into an integrated process obviating the need for a separate data demodulator in the receiver. For example, for GMSK signals with BT values of ⅓ and larger, the data demodulation performance in the symbol timing synchronizer can provide optimum performance. An advantage of the data aided carrier phase synchronizer is the combination of both carrier phase tracking and data demodulation functions into one integrated process obviating a need for separate data demodulator in the receiver. For example, for GMSK signals with BT values of ⅓ and larger, the data demodulation performance provided by the carrier phase synchronizer can also be optimum.

In the first form, the symbol time tracking synchronizer includes a data aided symbol timing error discriminator that extracts the timing error of the received CPM signal from the principal Laurent amplitude modulation component by an early and late gating operation followed by a multiplication of the data decision to remove the data modulation in the error signal. This symbol timing error signal is then tracked by a second order digital loop operating at the symbol rate. In the second form, the carrier phase tracking synchronizer includes a data aided phase error discriminator that extracts the phase error of the received CPM signal from the principal Laurent amplitude modulation component by a cross correlation operation with the data decision produced by a serial data demodulator. This error signal is then tracked by a second order digital loop also operating at the symbol rate.

These digital synchronizers are use to track the symbol timing or carrier phase of a continuous phase modulation signal received in the presence of noise with the receiver operating in a data demodulation mode. These synchronizers have a nondegraded bit error rate (BER) performance with reduced design complexity. The GMSK signal with a BT=⅕ can be used as a typical partial response CPM signal. The hardware implementation of such a GMSK receiver with both synchronizers can be modeled for providing simulated BER performance. With data precoding of the original data bit stream prior to transmission of the CPM signal, the synchronizers can function as serial demodulators that achieve absolute phase data detection. The data preceding and data aided synchronization approach for detecting symbol timing and carrier phase error is central to providing accurate symbol time and carrier phase tracking in the synchronizers with reduced design complexity. These and other advantages will become more apparent from the following detailed description of the preferred embodiment.

DETAILED DESCRIPTION OF THE PREFERRED EMBODIMENT

Figure 1A:
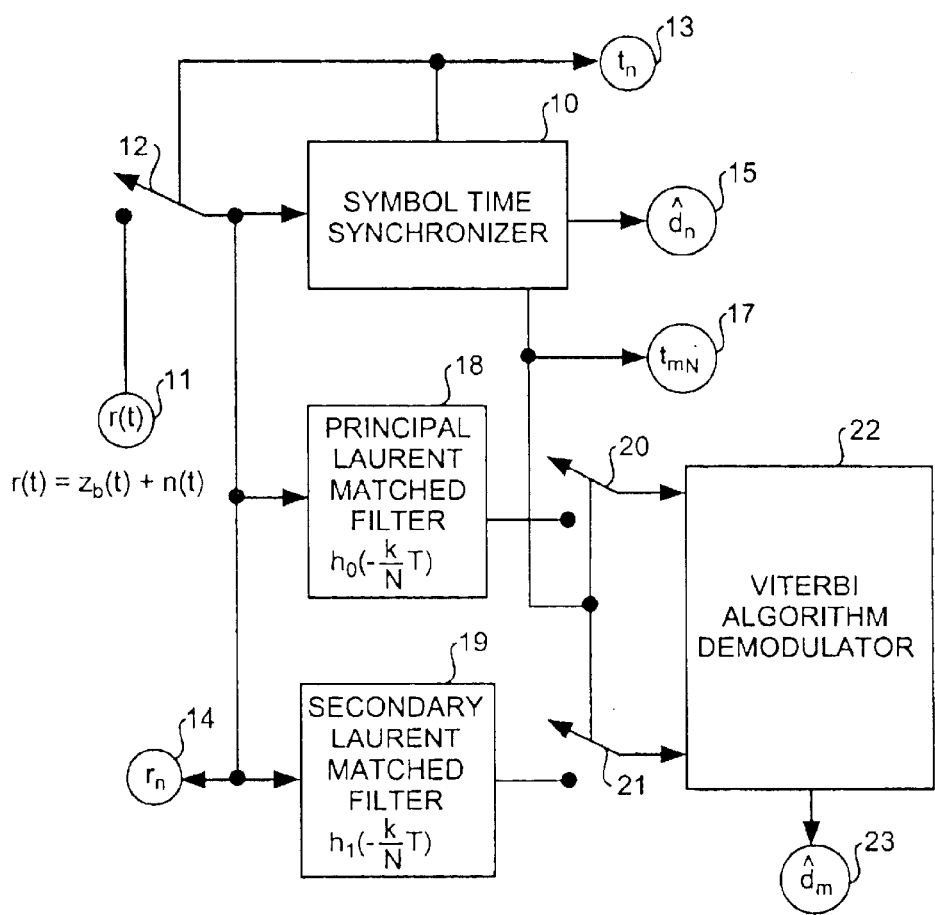
FIG. 1A is a block diagram of a symbol time synchronized data demodulator.

An embodiment of the invention is described with reference to the figures using reference designations as shown in the figures. Referring to FIG. 1A, a symbol time synchronized data demodulator includes a symbol time synchronizer 10 for data demodulating an r(t) received signal 11 sampled by input sampler 12 using a generated $t_n$ timing signal 13. The r(t) received signal 11 is a combination of the transmitted signal $z_b(t)$ and noise n(t) and is converted into an $r_n$ sampled input signal 14. The synchronizer 10 receives the sampled input signal 14 and provides a $\hat{d}_n$ estimate 15 of the received data sequence of the $r_n$ sampled input 14 as well as generating a $t_{mN}$ timing signal 17 and $t_n$ timing signal 13.

The $r_n$ sampled input 14 can be communicated to conventional Laurent matched filters such as a principal Laurent matched filter 18 and a secondary Laurent matched filter 19 having respective principal and secondary matched filter outputs respectively sampled by samplers 20 and 21 for providing respective filter samples into a Viterbi algorithm demodulator 22 that provides a $\hat{d}_m$ estimate 23. The matched filters 18 and 19, samplers 20 and 21, and demodulator 22 are used to generate the $\hat{d}_m$ estimate 23 of the original data sequence using the symbol timing of the $t_{mN}$ 17 timing signal generated by the symbol time synchronizer 10. The filters 18, 19 samplers 20 and 21, and demodulator 22 providing the am data estimate 23 represents conventional data demodulation.

Figure 1B:
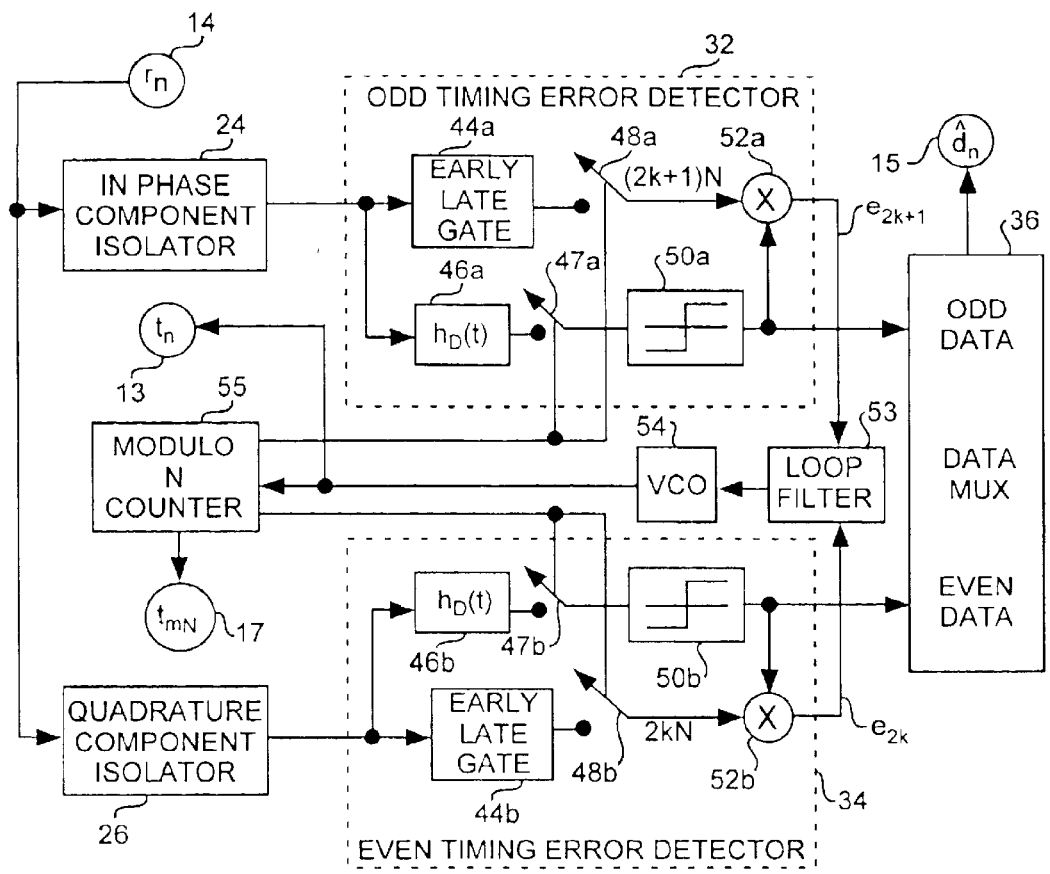
FIG. 1B is a block diagram of a symbol time synchronizer.

Referring to FIGS. 1A and 1B, and more particularly to the symbol time synchronizer of FIG. 1B, a real component and an imaginary component of the $r_n$ sampled input signal 14 are respectively isolated by an inphase component isolator 24 and a quadrature component isolator 26 respectively providing inphase and quadrature sample signals to an odd timing error detector 32 and an even timing error detector 34, that in turn, provide respective odd data and even data signals to a data demultiplexer 36 that provides the $\hat{d}_n$ estimated data sequence 15. The odd timing error detector 32 and even timing error detector 34 receive the inphase and quadrature sampled signals that are respectively communicated to early-late gates 44a and 44b and Laurent transformers $h_D(t)$ 46a and 46b isolating principal Laurent components. The Laurent transformer outputs of the transformers 46a and 46b are sampled by samplers 47a and 47b providing transformed sampled outputs. The early-late gate outputs of the early-late gates 44a and 44b are sampled by gate samplers 48a and 48b providing gate sampled outputs, respectively. The transformer sampled outputs of the transformer samplers 47a and 47b are respectively communicated to hard limiters 50a and 50b. The gate sampled outputs of the gate samplers 48a and 48b are respectively communicated to mixers 52a and 52b. The hard limiters 52a and 52b respectively provide the odd data and even data to the data multiplexer 36 that provides the $\hat{d}_n$ estimated data 15. The mixers 52a and 52b respectively mix odd and even data with the gate sampled outputs of gate samplers 48a and 48b to respectively provide $e_{2k+1}$ odd and $e_{2k}$ even timing signals that drive a loop filter 53, that in turn, controls a voltage controlled oscillator 54 used for generating the $t_n$ timing signal. The $e_{2k+1}$ odd and $e_{2k}$ even timing signals are alternately processed and combined by the loop filter 53 for controlling the voltage controlled oscillator 54. The $t_n$ timing signal 13 is further communicated to a modulo N counter 55 that provides the $t_{mN}$ timing signals as well as generating the $e(2k+1)N$ odd and $e(2k)N$ even sampling signals that respectively control the samplers 47a and 47b, and, 48a and 48b. As may now be apparent, the synchronizer 10 operates in a timing loop extending through samplers 47ab, limiters 50ab, mixers 52ab, loop filter 53, VCO 54 and counter 55 for synchronized generation of the odd and even data and the $t_n$ and $t_{mN}$ timing signals, 13 and 17, respectively, while generating the $\hat{d}_n$ data estimates 15.

Figure 2A:
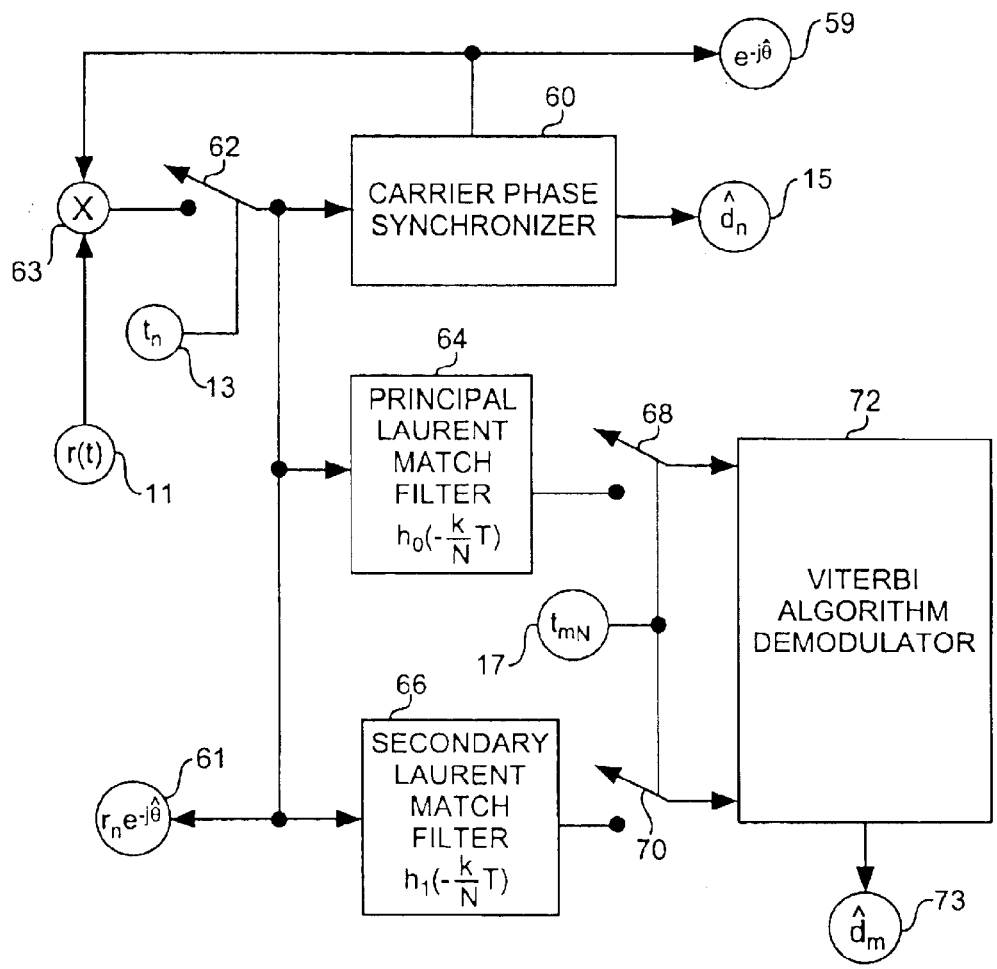
FIG. 2A is a block diagram of a carrier phase synchronized data demodulator.
Figure 2B:
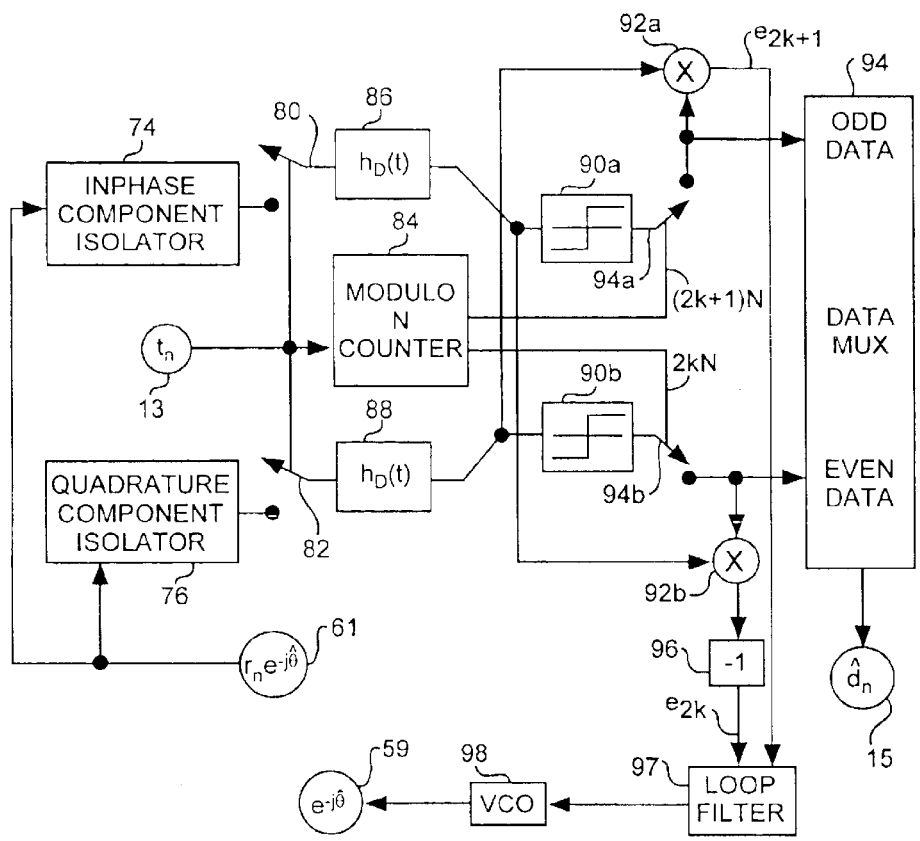
FIG. 2B is a block diagram of a carrier phase synchronizer.

Referring to FIGS. 1A, 1B, 2A and 2B, and more particularly to FIGS. 2A and 2B, the carrier phase synchronizer demodulator of FIG. 2A and specifically the carrier phase synchronizer 60 of FIG. 2B, the carrier phase synchronizer 60 generates a $e^{-j\hat{\theta}}$ phase adjustment signal 59 for adjusting the phase of the r(t) input signal 11. The carrier phase synchronizer 60 also receives an $r_n e^{-j\hat{\theta}}$ input sample signal 61 from a carrier phase sampler 62. The r(t) received input signal 11 and $e^{-j\hat{\theta}}$ phase adjustment signal are mixed by a mixer 63 that provide an input mixed signal that is sampled by a carrier phase sampler 62 at the rate of the $t_n$ timing signal for providing the $r_n e^{-j\hat{\theta}}$ sampled input signal 61 to the carrier phase synchronizer 60. The $r_n e^{-j\hat{\theta}}$ input sampled signal 61 can be fed into a conventional principal Laurent matched filter 64 and a secondary Laurent filter 66 providing matched filters outputs respectively to and sampled by matched filtered samplers 68 and 70 sampled at the rate of the $t_{mN}$ symbol timing signals for providing matched filter inputs into a Viterbi algorithm demodulator 72 that generates a $\hat{d}_m$ estimate 73 of the original data sequence. The carrier phase synchronizer 60 can also be used to generate the $\hat{d}_n$ data estimate is.

The carrier phase synchronizer 60 receives the $t_n$ timing signal that may originate from the symbol time synchronizer 10 in the preferred form, or from a convention symbol timing tracking loop, not shown. The $r_n e^{-j\hat{\theta}}$ sample input signal 61 is communicated to an inphase component isolator 74 and a quadrature component isolator 76. The inphase component output of isolator 74 and the quadrature component output of isolator 76 are respectively sampled by an inphase sampler 80 and a quadrature sampler 82 at the rate of the $t_n$ symbol timing signal 13 that also drives a modulo N counter 84 providing 2kN even and (2k+1)N odd timing sampling signals. The inphase sampler 80 provides a sampled inphase signal to an inphase transformer 86 as the quadrature sampler 82 provides a sampled quadrature signal to a quadrature transformer 88, providing respectively inphase and quadrature transformed signals to hard limiters 90a and 90b, and by cross coupling, to mixers 92b and 92a. The hard limiters 90a and 90b respectively provide inphase and quadrature hard limited signals to hard limiter samplers 94a and 94b that respectively sample at rates of the 2kN even and (2k+1)N odd timing sampling signals from the modulo N counter 84. The hard limiter samplers 94a and 94b respectively provide odd and even data signals that are fed into a data multiplexer 94 for generating the $\hat{d}_n$ data estimate 15. The odd data and even data are respectively mixed with the quadrature and inphase transformed signals from the transformers 88 and 86, respectively, by the mixer 92a and 92b, for generating $e_{2k+1}$ odd and $-e_{2k}$ even timing error signals. The $-e_{2k}$ timing error signal is inverted by inverter 96 for generating an $e_{2k}$ even timing signal. The $e_{2k}$ even and $e_{2k+1}$ odd timing error signals are alternately processed and combined by the loop filter 97 to form the $e^{-j\hat{\theta}}$ phase adjustment signal 59. The $e_{2k}$ even and $e_{2k+1}$ odd timing error signals drive a loop filter 97 that in turn controls a VCO 98 that generates the $e^{-j\hat{\theta}}$ phase adjustment signal 59. As may now be apparent, the carrier phase synchronizer 60 is part of a loop between the $e^{-j\hat{\theta}}$ phase adjustment signal 59 and the $r_n e^{-j\hat{\theta}}$ input sampled signal 61 with the loop extending through the isolators 74 and 76, samplers 80 and 82, transformers 86 and 88, hard limiters 90a and 90b, samplers 94a and 94b, mixers 92a and 92b, loop filter 97 and VCO 98 for providing the $e^{-j\hat{\theta}}$ phase adjustment signal 59, while concurrently generating the $\hat{d}_n$ data estimate 15.

Figure 3:
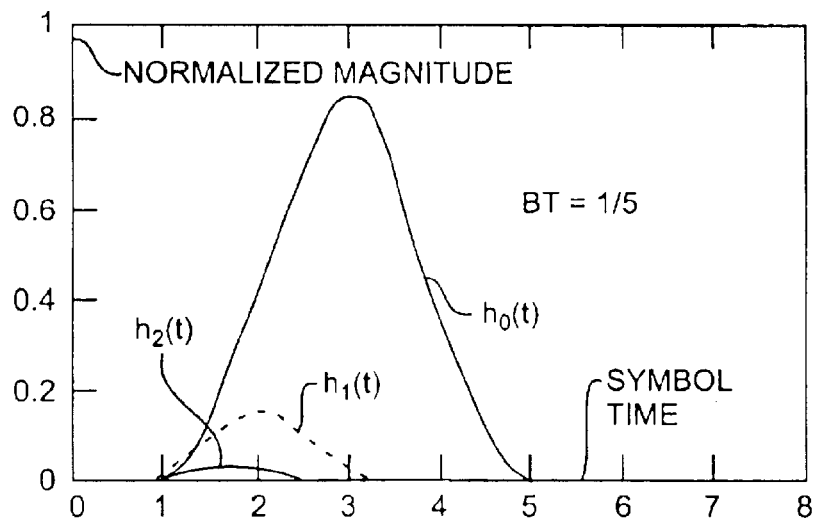
FIG. 3 is a graph depicting Laurent pulse functions.
Figure 4:
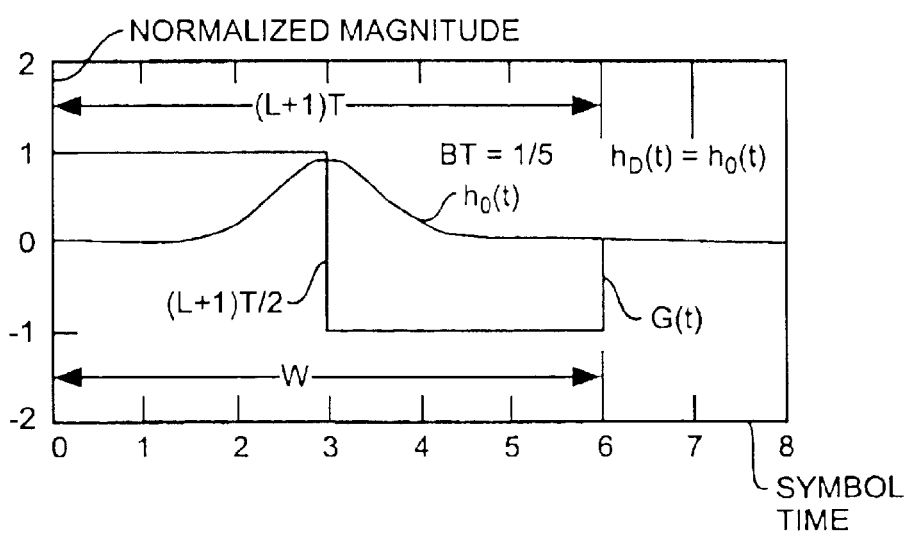
FIG. 4 is a graph depicting an early-late gate function.
Figure 5:
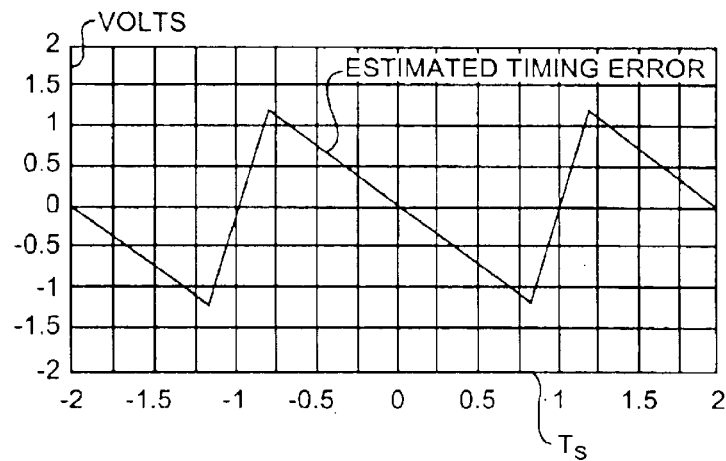
FIG. 5 is a plot of a symbol time error discriminator curve.

Referring to all of the Figures, the Laurent pulse function is shown in FIG. 3 for the principal $h_0$ pulse function, the $h_1(t)$ secondary pulse function and the $h_2(t)$ tertiary pulse function. The inphase component isolators 24 and 74 isolate the real component of the $r_n$ input signal as the quadrature component isolators 16 and 76 isolate the imaginary component of the $r_n$ input signal. The inphase Laurent transformers 46a and 86 isolate the energy of the principal Laurent pulse component of the real component of the $r_n$ input signal as the quadrature. Laurent transformers 46b and 88 isolate the energy of the principal Laurent pulse component of the imaginary component of the $r_n$ input signal. The early-late gate function is shown in FIG. 4 for providing a digital transition in synchronism with Laurent components as isolated by the isolators 24 and 26. In the symbol timing synchronizer 10, the early-gates 44a and 44b operate on the respective isolated real and imaginary component energy for indicating the magnitude of the symbol timing error. The early-late gates 44a and 44b ideally have a positive value and a negative value on early and late respective sides of the center of the principal Laurent pulse function. These +/− values are combined with respective sides of the principal Laurent pulse function to provide two equal but opposite products that ideally sum to a zero magnitude error. As the principal Laurent pulse function early or late shifts relative to the current timing of the +/− gate function, the magnitude error increases positively or negatively. The area under the principal Laurent pulse function is multiplied by the gate function to produce a cross correlation of the gate function and principal Laurent pulse function for generating the magnitude error value that is used to adjust the timing signal to be in synchronism with the current symbol time of the received signal. FIG. 5 shows symbol timing errors for the symbol timing synchronizer 10.

Figure 6:
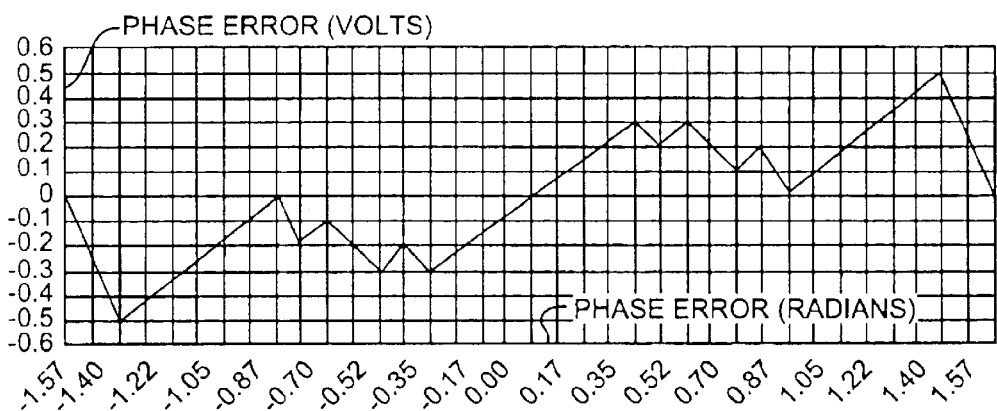
FIG. 6 is a plot of a carrier phase discriminator curve.

The carrier phase synchronizer 60 uses the Laurent transformers 86 and 88 for isolating the energy of the principal Laurent pulse component for generating the magnitude of the carrier phase error. The carrier phase synchronizer 60 also uses cross coupled principal Laurent pulse energy for indicating the sign of the carrier phase error. FIG. 6 shows the carrier phase errors of the carrier phase synchronizer 60.

The symbol time synchronized data demodulator includes the symbol time synchronizer 10 for generating the $t_n$ timing signal 13 as well as the $\hat{d}_n$ data estimates 15. The carrier phase synchronizer 60 receives the $t_n$ symbol timing signal 13 for sampling the real and imaginary isolated components as well as for generating the odd and even data of the $\hat{d}_n$ data estimates 15. Hence, both of the synchronizers 10 and 60 operate as serial data demodulators for generating the $\hat{d}_n$ data estimate 15. Both of the symbol timing and carrier phase serial demodulators of synchronizers 10 and 60 operate respective modulo N counters 55 and 84 at the rate of N counts per symbol period of T seconds clocked at the rate of the $t_n$ symbol timing signal 13. The complex envelope $Z_b(t)$ of the CPM input signal 11 is sampled at a uniform rate of N samples per symbol period. These $r_n$ samples are simultaneously applied to the Laurent transformers 46a, 46b, 86, and 88 that function as data detection filters.

In the symbol timing synchronizer 10, the early-late gates 44a and 44b function as impulse response filters. At each symbol decision instant of t=KN sample counts, for odd values of K, i.e., K=2k+1, the timing error between the receiver $t_n$ timing signal 13 and the timing of the received signal is formed by respectively multiplying the output of the early-late gate 44a the algebraic sign of the respective data detection filter, that is, the transformer 46a and hard limiters 50a. For even values of K, i.e., K=2k, the even timing error detector 34 operates similar to the odd time error detector 32. The algebraic sign of the data detection filter outputs, that is, the output of the hard limiters 50a and 50b, is a data decision on the received data symbol for precoded binary CPM received signals. The timing error formed by the detectors 32 and 34 is then filtered by the loop filter 53, integrated by the VCO 54, and quantized into sample counts by the modulo N counter 55 to produce an adjustment to the sampling timing at symbol epoch i.e., at time instants of a multiple of N counts. The symbol timing signal 13 as well as the sampling signals are delayed or advanced by the timing adjustment according to whether the adjustment is positive or negative. No more than N most recent signal samples need to be stored by the synchronizer to allow for the advancing of the sampling timing at the symbol time in the tracking mode.

During data demodulation, the transmitted data symbol can be obtained by differentially decoding two successively received pseudo data symbols $a_{0,n}$. For a CPM modulation index of h=0.5, the data stream is precoded into a data stream $d_k$ fed into the data modulator having an input symbol stream $\alpha_k$ with $\alpha_k=(-1)^k d_{k-1} d_k$. The pseudo data symbol $a_{0,n}$ becomes $a_{0,n}=J(n)d_n$ with $J(n)=1$ for n being odd and $J(n)=j$ for n being even. Thus, with data precoding, either a conventional trellis demodulator or a serial demodulator of the synchronizers 10 and 60 can be used to demodulate the received CPM signal without differential decoding. A CPM modem using precoding can achieve a performance improvement from 0.5 dB to nearly 2.0 dB over a modem without precoding.

Because the Laurent pulse function $h_0(t)$ is the dominant pulse function in a CPM signal, the symbol timing error of the received signal relative to the receiver clock can be detected by using the early-late gating on the received baseband signal in conjunction with serial data demodulation of the synchronizers 10 and 60. The timing error is produced by respectively multiplying the data decisions generated by the serial demodulation of the transformers 46a and 46b and the hard limiters 50a and 50b with the output of the early-late gate 44a and 44b. Respective multiplication by mixers 52a and 52b of the early-late gate output with hard limited data decisions is needed to eliminate the data modulation so that a consistent timing error can be formed. With ideal elimination of the data modulation, the detected timing error is given by a detection equation.

$$D_t(\tau) = \int_0^{(L+1)T} G(s) h_0(s-\tau) ds$$

The early-late gate function G(t) provides an ideal timing error detection curve $D_t(\tau)$ for a given CPM signal, such as a BT=⅕ GMSK signal.

Carrier phase error detection is formulated based on a unit amplitude CPM signal received in the absence of channel noise with a carrier phase offset θ. The phase offset complex signal envelope is defined by an r(t,θ) equation.

$$r(t, \theta) = z_b(t) e^{j\theta}$$
$$= \left\{ \sum_{k=0}^{Q-1} \sum_{n=0}^{N-1} a_{k,n} h_k(t-nT) \right\} e^{j\theta}$$

When the r(t,θ) signal is applied to the transformed and hard limited serial demodulator, the demodulator output at time t=mT is defined by an $r_m$ equation.

$$r_m = \int_{-\infty}^{\infty} r(t, \theta) h_0(t-mT) dt$$
$$= \left\{ \sum_{k=0}^{Q-1} \sum_{n=0}^{N-1} a_{k,n} R_{0,k}(m-n) \right\} e^{j\theta}$$

$$= J(m)d_m e^{j\theta} R_{0,0}(0) + \left\{ \sum_{k=0}^{Q-1} \sum_{\substack{n=0 \\ (n \neq m, \\ k=0)}}^{N-1} a_{k,n} R_{0,k}(m-n) \right\} e^{j\theta} \text{ where}$$

$$R_{0,k}(p) = \int_{-\infty}^{\infty} h_0(t) h_k(t + pT) dt$$

With the data $d_k$ being equally probable, the averaged value of $d_m a_{k,n}$ is zero for all integers m, when k≠0, and also for all integers m≠n when k=0. Thus, with the carrier phase error θ being small and when the serial demodulators can correctly demodulate the m-th transmitted bit $d_m$, then, by multiplying the serial demodulated bit by the complex conjugate of $J(m)d_m$ and taking the imaginary part of the product obtains a random variant whose mean value is $D_\phi(\theta) = R_{0,0}(0)\sin(\theta) \approx R_{0,0}(0)\theta$. The randomness is due to the intersymbol interference, which is data pattern dependent.

Because both timing and carrier phase error detection use serial demodulation to provide the required data decision for error generation, the transformed and hard limited serial demodulator, such as in the synchronizers 10 and 60, can be used for both the tracking error generation and data detection. The error signals produced at every receiver symbol time are applied to the respective loop filter 53 and 97 and voltage control oscillator 54 and 98 to adjust the sampling timing instants or the carrier phase to the received signal. Data reliability of a trellis demodulator is usually better than that of a serial demodulator such as the synchronizers 10 and 60, particularly when the signal memory span L is large. However, if L is small or if an equalizer is used in cascade with the principal Laurent pulse filter, the simple serial receiver can perform practically as well as the more complex trellis demodulator for the purpose of tracking error generation. Thus, an equivalent variation of the synchronizers 10 and 60 is to feedback the data decisions from the trellis demodulator to the error detectors, provided that the processing delay of the trellis demodulator is properly compensated for and that tracking performance is not unduly compromised by the delay.

The mean error output or discriminator characteristics of the symbol timing error and carrier phase error detectors is shown for the BT=⅕ GMSK signal, in FIG. 5 and FIG. 6, respectively. These characteristics are obtained by computing in random data the averaged detector output for a given error offset with the other offset error set at zero. For small errors, the linear slope of the timing error discriminator curve is about −1.5 and that of the phase error discriminator curve is about 1.0. The deviation of these characteristics from their ideal S curves, at large offset errors, is attributed to the feedback of erroneous data decisions caused by the intersymbol interference in the GMSK signal.

Both the symbol time synchronizer 10 and carrier phase synchronizer 60 have a linear continuous time model that can be implemented digitally for use in performance simulations of the GMSK receiver. The linear model is appropriate because the tracking error is typically small when the receiver is in a tracking mode. The loop filter, used in each synchronizer 10 and 60, is of a proportional and integral type with a transfer function in the form of $F(s)=\alpha+\beta/s$ and the VCO transfer function in the form of $K_v/s$ where $K_v$ is the VCO gain. The closed loop transfer function of the synchronizers 10 and 60 is defined by an H(s) equation.

$$H(s) = \frac{\phi_0(s)}{\phi_1(s)} = \frac{2\zeta\omega_n s + \omega_n^2}{s^2 + 2\zeta\omega_n s + \omega_n^2}$$

In the H(s) equation, the term $\zeta$ is the damping factor and $\omega_n$ is the natural frequency of the synchronizers 10 and 60. These parameters are related to the loop filter and gain parameters by $\alpha=2\zeta\omega_n/K_D K_v$ and $\beta=\omega_n^2/K_D K_v$ where $K_D$ is the slope of the error discriminator curves shown in FIGS. 5 and 6. The one-sided equivalent noise bandwidth of the synchronizers 10 and 60 is $B_L=(\omega_n/8\zeta^2)(1+4\zeta^2)$. Each of the second order synchronizers 10 and 60 can be digitally implemented with the integrator 1/s approximated by the digital accumulator $1/(1-z^{-1})$ where $z^{-1}$ represents a unit bit time delay. In a digital implementation, the natural frequency and loop bandwidth parameters should be regarded as parameters normalized by the bit rate. Using the loop parameters $K_D=1$, $K_v=1$ and $\zeta=1/\sqrt{2}$ for the carrier phase synchronizer 60 and $K_D=\sqrt{1.5}$, $K_v=1$ and $\zeta=1/\sqrt{2}$ for the symbol time synchronizer 10, the step error response of the carrier phase synchronizer 60 to a 20 degree phase step and that of the symbol time synchronizer 10 to a half bit time step are simulated and compared to the theoretical step error response. The ramp error responses for both synchronizers 10 and 60 are also simulated and compared to the theoretical ramp error responses. The dispersion of the simulated error responses from the theoretical is due to the intersymbol interference in the received signal.

The symbol time synchronizer 10 and carrier phase synchronizer 60 are characterized as providing error signals generated from quadrature Laurent pulse response components of a receiving signal modulated by symbols generated from a precoded data sequence. In the preferred form, the principal Laurent components indicates the original digital bit sequence of the precoded bit stream. The precoding functions to precondition the transmitted symbol sequence so that the principal Laurent function indicates the original data bit stream that is alternately disposed on the I and Q channels of the transmitted CPM signal.

The precoded PCM signal allows the use of the principal Laurent pulse response for extracting the sign of the symbol timing error or carrier phase error that is also the data of the original data uncoded sequence. In the symbol time synchronizer 10, the early-late gates 44a and 44b will extract the magnitude of the symbol timing error. The early-late gates 44a and 44b are sampled at the current symbol $t_n$ timing signal 13. As the timing of the received signal 11, varies from the current timing of the timing signal 13, the early-late gates 44a and 44b provide an indication of the magnitude of the current timing error. The CPM signal will carry the data information in one symbol time in the inphase component signal and in the next symbol instance in the quadrature component signal, as the data bit information content alternates between the inphase and quadrature components. The timing synchronizer 10 in combination with data preceding enable efficient synchronization timing and data extraction at the expense of requiring the use of both I & Q component signals that might otherwise be used to communicate two independent data streams. The loop filter 53 functions to smooth the timing error signal generated by the detectors 32 and 34. The smoothed timing error from the loop filter 53 then drives the VCO that in turn provides the smoothly varying $t_n$ timing clock signal. The precoded data provides the sign of the timing error, and hence, the symbol timing synchronizer 10 is data aided, and hence also provides an estimate 15 of the original data sequence.

In the carrier phase synchronizer receives the $t_n$ timing signal and the received signal $r_n$ and operates on the phase error θ generated from the r(t,θ) equation that describes the phase error. The carrier phase synchronizer 60 also uses the isolated I & Q principal Laurent components and determines the sign of the phase error. But, rather than determining a magnitude of the phase error using early-late gates, the carrier phase synchronizer drifts the phase error depending on the sine of the phase error having a sign that is also the original uncoded data sequence. The § term represents the carrier phase error that is generated using cross-coupling of the Laurent components generating the $e_{2k}$ and $e_{2k+1}$ error signals with the sign of $\hat{\theta}$ indicating the direction of the phase error drift.

The symbol timing synchronizer 10 and the carrier phase synchronizer 60 offer an efficient mechanism for generating timing and phase error signal while also providing an indication of the uncoded data sequence however requiring data precoding having symbol modulated on both I and Q channels. Those skilled in the art can make enhancements, improvements, and modifications to the invention, and these enhancements, improvements, and modifications may nonetheless fall within the spirit and scope of the following claims.

What is claimed is:

1. A symbol timing synchronizer for generating a timing signal from a sampled input signal being a received input signal sampled at a rate of the timing signal, the received input signal being a continuous phase modulated signal modulated by a symbol sequence generated from a precoded data sequence of an input data sequence, sampled input signal having a sampled inphase component and a sampled quadrature component, the symbol timing synchronizer comprising, an inphase isolator and a quadrature isolator for respectively isolating the sampled inphase component and sampled quadrature component of the sampled input signal for respectively providing an inphase signal and a quadrature signal, an inphase serial data demodulator and a quadrature serial data demodulator for respectively receiving and filtering the inphase signal and the quadrature signal for generating an odd filter response and an even filter response, and for converting and sampling the odd and even filter responses into odd data and even data, the odd data and the even data alternately forming an estimate of the input data sequence, an inphase error magnitude generator and a quadrature error magnitude generator for receiving and filtering the inphase signal- and the quadrature signal, for respectively generating and sampling an inphase error magnitude signal and quadrature error magnitude signal for respectively generating a sampled inphase error magnitude signal and a sampled quadrature error magnitude signal, an inphase mixer and a quadrature mixer for respectively mixing the sampled inphase error magnitude signal with the odd data into an odd error signal, and mixing the quadrature error magnitude signal with the even data for generating an even error signal, the odd data representing an odd sign of the inphase magnitude error signal, the even data representing an even sign of the quadrature magnitude signal, and an oscillator means for generating the timing signal from the even error signal and the odd error signal, the timing signal for controlling the sampling of the inphase serial data demodulator and the quadrature serial data demodulator and for controlling the sampling of inphase error magnitude generator and a quadrature error magnitude generator for generating the timing signal at a rate of the symbol sequence.

2. The symbol timing synchronizer of claim 1 wherein the oscillator means comprises, a loop filter for receiving the odd error signal and the even error signal for providing a filter error signal, a controlled oscillator for receiving the filter error signal for generating the timing signal, and a modulo counter for providing an odd timing signal for sampling the inphase magnitude error signal, and for providing an even timing signal for sampling the quadrature magnitude error signal.

3. The symbol timing synchronizer of claim 1 wherein, the inphase magnitude error generator generates the inphase magnitude error signal from a difference between a filter response of the inphase signal and an odd modulo count of the timing signal, the inphase magnitude error generator serving to cross correlate a principal Laurent component of the inphase signal with a gate function relative to the odd modulo count of the timing signal, and the quadrature magnitude error generator generates the quadrature magnitude error signal from a difference between a filter response of the quadrature signal and an even modulo count of the timing signal, the quadrature magnitude error generator serving to cross correlate a principal Laurent component of the inphase signal with a gate function relative to the even modulo count of the timing signal.

4. The symbol timing synchronizer for claim 1 wherein, inphase and quadrature serial demodulators respectively filter principal Laurent components of the inphase and quadrature signals for providing odd and even Laurent filter responses, and inphase and quadrature serial demodulators respectively sample the odd and even Laurent filter responses for generating the odd and even data.

5. The symbol timing synchronizer of claim 1 further comprising an input sampler for sampling the received signal into the sampled input signal sampled at a rate of the timing signals.

6. The symbol timing synchronizer of the claim 1 further comprising, a multiplexer for multiplexing the odd and even data into the estimate of the input data sequence.

7. The symbol timing synchronizer of claim 1 wherein, the received input system is a Gaussian minimum shift keying signal have a bit bandwidth product of ⅕ and a modulation index of ½.

8. The symbol timing synchronizer of claim 3 wherein, the odd modulo count is (2k+1)N where N is the modulo count of the modulo counter, and the even modulo count is (2k)N where N is the modulo count of the modulo counter, where k is a symbol index.

9. The symbol timing synchronizer of claim 1 wherein the odd error signal is an $e_{2k+1}$ odd error signal, and the even error signal is an $e_{2k}$ even error signal, where k is a symbol index.

10. The symbol timing synchronizer of claim 1 further comprising a carrier phase synchronizer for generating a phase adjustment signal from a sampled phase adjusted input signal and the timing signal, an input mixer for adjusting the received input signal into a phase adjusted input signal, and an input sampler for sampling the phase adjusted input signal into the sampled phase adjusted input signal.

11. The symbol timing synchronizer of claim 10 wherein the carrier phase synchronizer comprises, an inphase isolator and a quadrature isolator for respectively isolating the sampled inphase component and sampled quadrature component for providing an inphase signal and a quadrature signal, an inphase serial data demodulator and a quadrature serial data demodulator for respectively receiving and filtering the inphase signal and the quadrature signal for generating an odd filter response and an even filter response, and for converting and sampling the odd and even filter responses into odd data and even data, the odd data and the even data alternately forming an estimate of the input data sequence, an odd mixer and an even mixer for respectively mixing the even filter response and the odd data signal into an odd error signal and mixing the odd filter response signal and the even data signal into an even error signal, and an oscillator means for converting the odd and even error signals into the phase adjustment signal.

12. A symbol timing synchronizer for generating a timing signal from a sampled input signal being a received input signal sampled at a rate of the timing signal, the received input signal being a continuous phase modulated signal modulated by a symbol sequence generated from a precoded data sequence of an input data sequence, sampled input signal having a sampled inphase component and a sampled quadrature component, the symbol timing synchronizer comprising, an inphase isolator and a quadrature isolator for respectively isolating the sampled inphase component and sampled quadrature component of the sampled input signal for respectively providing an inphase signal and a quadrature signal, an inphase early-late gate and a quadrature early-late gate for respectively filtering the inphase signal and the quadrature signal for generating an inphase gate signal and a quadrature gate signal, the inphase and quadrature early-late gates respectively serving to cross correlate the inphase and quadrature signals with gate functions in synchronism with the timing signal, an inphase transformer and a quadrature transformer for respectively transforming the inphase signal and the quadrature signal for generating an inphase transformed signal and a quadrature transformed signal, an inphase gate sampler and a quadrature gate sampler for respectively sampling inphase gate signal and the quadrature gate signal for generating a sampled inphase gate signal and a sampled quadrature gate signal, an inphase transformer sampler and a quadrature transformer sampler for respectively sampling the inphase transformed signal and the quadrature transformed signal for generating a sampled inphase transformed signal and a sampled quadrature transformed signal, an inphase hard-limiter and a quadrature hard limiter for respectively converting the sampled inphase transformed signal into odd data and the sampled quadrature transformed signal into even data, an inphase mixer and a quadrature mixer for respectively mixing the sampled inphase gate signal and odd data into an odd error signal and mixing the sampled quadrature gate signal and even data signal into an even error signal, and an oscillator means for generating the timing signal from the even error signal and the odd error signal, the oscillator means for controlling the sampling of the inphase and quadrature gate samplers and the inphase and quadrature transformer samplers for generating the timing signal at a rate of the symbol sequence.

13. The symbol timing synchronizer of claim 12 wherein the oscillator means comprises, a loop filter for receiving the odd error signal and the even error signal for providing a filter error signal, a controlled oscillator for receiving the filter error signal for generating the timing signal, and a modulo counter for providing an odd timing signal for sampling the inphase magnitude error signal, and for providing an even timing signal for sampling the quadrature magnitude error signal.

14. The symbol timing synchronizer of claim 12 wherein, the inphase and quadrature early-late gates function as cross correlators for cross correlating a filter response isolating principal Laurent components of the inphase and quadrature signals with a gating function, the inphase gate signal is an inphase magnitude error signal from the correlation of an inphase early-late gate filter response of the inphase signal and the gating function that is in synchronism with an odd modulo count of the timing signal, and the quadrature gate signal is a quadrature magnitude error signal from the correlation of a quadrature early-late gate filter response of the quadrature signal and the gating function that is in synchronism an even modulo count of the timing signal.

15. The symbol timing synchronizer for claim 12 wherein, the inphase and quadrature transformers, transformer samplers and hard-limiters respectively are inphase and quadrature serial demodulators, the inphase and quadrature transformer are principal Laurent component filters providing the inphase and quadrature transformed signals that respectively are odd and even Laurent filter responses, and the odd and even data alternately forming an estimate of the input data sequence.

16. The symbol timing synchronizer of claim 12 further comprising an input sampler for sampling the received signal into the sampled input signal sampled at a rate of the timing signal, and a multiplexer for multiplexing the odd and even data into the estimate of the input data sequence.

17. The symbol timing synchronizer of claim 12 wherein, the received input system is a Gaussian minimum shift keying signal have a bit bandwidth product of ⅕ and a modulation index of ½, the odd modulo count is (2k+1)N where N is the modulo count of the modulo counter, the even modulo count is (2k)N where N is the modulo count of the modulo counter, the odd error signal is an $e_{2k+1}$ odd error signal, and the even error signal is an $e_{2k}$ even error signal, where k is a symbol index.

18. The symbol timing synchronizer of claim 12 further comprising a carrier phase synchronizer for generating a phase adjustment signal from a sampled phase adjusted input signal and the timing signal, an input mixer for adjusting the received input signal into a phase adjusted input signal, and an input sampler for sampling the phase adjusted input signal into the sampled phase adjusted input signal.

19. The symbol timing synchronizer of claim 18 wherein the carrier phase synchronizer comprises, a carrier inphase isolator and a carrier quadrature isolator for respectively isolating the carrier sampled inphase component and carrier sampled quadrature component for providing a carrier inphase signal and a carrier quadrature signal, an inphase sampler and a quadrature sampler for respectively sampling at the rate of the timing signal the carrier inphase signal and the carrier quadrature signal for providing a carrier sampled inphase signal and a carrier sampled quadrature signal, a carrier inphase transformer and a carrier quadrature transformer for respectively transforming the carrier sampled inphase signal and carrier sampled quadrature signal into a carrier inphase transformed signal and a carrier quadrature-transformed signal, a carrier inphase hard limiter and a carrier quadrature hard limiter for respectively converting the carrier inphase transformed signal and carrier quadrature transformed signal into a carrier odd hard limited signal and a carrier even hard limited signal, a carrier modulo counter for receiving the timing signal and generating a carrier odd timing signal and a carrier even timing signal, a carrier odd sampler and a carrier even sampler for respectively sampling at the rate of the carrier odd and even timing signals for sampling the carrier odd and even hard limited signals into carrier odd data and carrier even data, a carrier odd mixer and a carrier even mixer for respecting mixing the carrier quadrature transformed signal and the carrier odd data signal into a carrier odd error signal and the carrier inphase transformed signal and the carrier even data signal into a carrier even error signal, and a carrier oscillator for converting the carrier odd and even error signals into the phase adjustment signal.

\* \* \* \* \*